(12) United States Patent
Martz et al.

(10) Patent No.: US 11,506,098 B1
(45) Date of Patent: Nov. 22, 2022

(54) SYSTEMS AND METHODS FOR TURBOCHARGER

(71) Applicant: Ford Global Technologies, LLC, Dearborn, MI (US)

(72) Inventors: Jason Brian Martz, Canton, MI (US); Liangjun Hu, Bloomfield Hills, MI (US); Paul Joseph Tennison, West Bloomfield, MI (US); Eric Matthew Kurtz, Dearborn, MI (US); Gregory McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/652,573

(22) Filed: Feb. 25, 2022

(51) Int. Cl.
*F01N 3/18* (2006.01)
*F02C 6/12* (2006.01)

(52) U.S. Cl.
CPC ............. *F01N 3/18* (2013.01); *F02C 6/12* (2013.01); *F01N 2410/00* (2013.01); *F05D 2270/303* (2013.01)

(58) Field of Classification Search
CPC ....... F01N 3/18; F01N 2410/00; F01N 3/2006; F02C 6/12; F05D 2270/303
See application file for complete search history.

(56) References Cited

U.S. PATENT DOCUMENTS

| 7,597,081 | B2 | 10/2009 | Aw |
| 8,683,786 | B2 | 4/2014 | Ruona et al. |
| 9,255,508 | B2 | 2/2016 | Yacoub |
| 2014/0230410 | A1* | 8/2014 | Yacoub ............... F01N 3/2006 60/299 |

FOREIGN PATENT DOCUMENTS

EP    3441587 A1    2/2019

* cited by examiner

*Primary Examiner* — Audrey B. Walter
*Assistant Examiner* — Edward Bushard
(74) *Attorney, Agent, or Firm* — Vincent Mastrogiacomo; McCoy Russell LLP

(57) ABSTRACT

Methods and systems are provided for a turbocharger. In one example, a method may include flowing bleed air to control a catalyst temperature. The bleed air is directed from a bleed port of a compressor of an engine system.

20 Claims, 4 Drawing Sheets

SYSTEMS AND METHODS FOR TURBOCHARGER

FIELD

The present description relates generally to adjusting air flow from a compressor in response to a catalyst temperature.

Background/Summary

Engines may use a turbocharger to improve engine torque/power output density. A turbocharger may include a compressor and a turbine connected via a drive shaft, where the turbine is coupled to an exhaust manifold and the compressor is coupled to an intake manifold. Exhaust gases may drive the turbine, which supplies energy to the compressor to increase air flow to the engine.

The turbine may be arranged upstream of a catalyst configured to treat certain combustion byproducts in an exhaust gas flow. A temperature of the catalyst may be controlled to provide a desired conversion rate of the byproducts while also mitigating degradation to the catalyst. During some operating conditions, temperature control of the catalyst may be relatively difficult. For example, during higher loads or higher driver demands, the catalyst temperature may exceed an upper threshold temperature, which may increase a likelihood of catalyst degradation.

Examples of addressing catalyst temperature control may include derates to reduce peak engine power and torque to avoid increasing the catalyst temperature above the upper threshold temperature. However, this may reduce customer satisfaction. Other examples may include introducing one or more heat sinks between the turbine and the catalyst, cooling the exhaust gas via coolant, injecting air or water into an exhaust passage to decrease an exhaust temperature, and compressors with a ported shroud.

However, the inventors have identified some issues with the approaches described above. For example, packaging space is constrained in modern designs. Thus, the introduction of additional heat sinks or an auxiliary pump may demand a redesign while also increasing manufacturing complexity. Injecting boosted fresh air from downstream of the compressor to upstream or downstream of a charge-air-cooler (CAC) may increase a cooling system demand, which may be at its limit during peak engine power and torque conditions when catalyst temperatures increase. Thus, the peak power and torque derate may still be needed.

In one example, the issues described above may be addressed by a method for flowing bleed air from a bleed port of a compressor to a portion of an exhaust passage upstream of a catalyst in response to a catalyst temperature. In this way, a catalyst conversion efficiency and longevity may be improved.

As one example, the bleed port may provide bleed air to an exhaust passage without adjusting a compressor load efficiency. Additionally, by drawing air from the bleed port at a location where pressures are less than a compressor outlet pressure, the air temperature may be less than the temperature at the compressor outlet, reducing cooling requirements. Alternatively, compressor size may be maintained or reduced, which may maintain or improve a surge margin and decrease lag, compared to existing methods which need to increase compressor size. By doing this, catalyst temperatures may be maintained without increasing a packaging size of the turbocharger and the exhaust system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
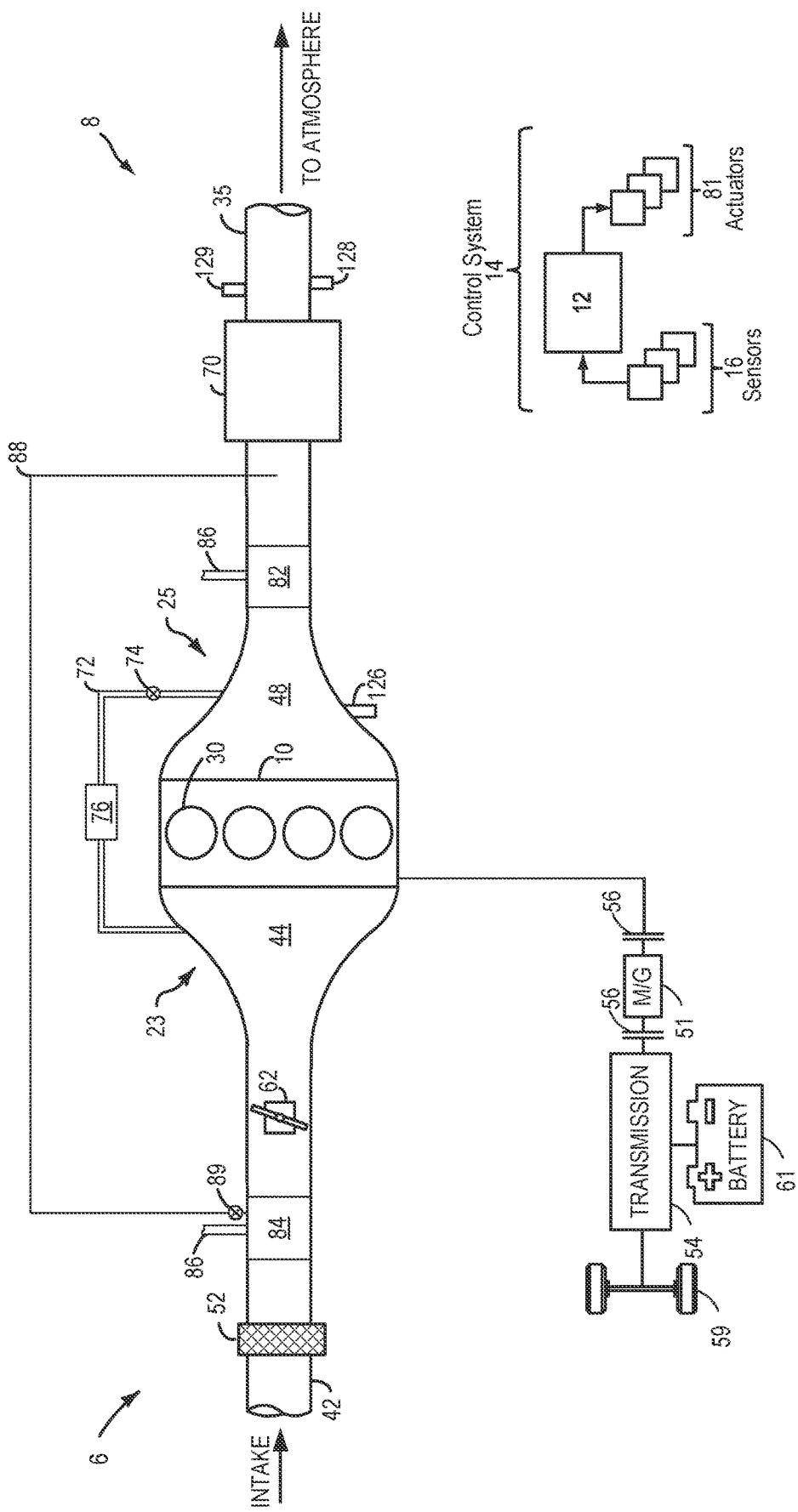
FIG. 1 illustrates a schematic of an engine included in a hybrid vehicle.

The following description relates to systems and methods for a turbocharger. The turbocharger may include a turbine and a compressor coupled to one another and arranged in an engine system of a vehicle, as shown in FIG. 1. The compressor may include a bleed port configured to bleed air from the compressor at a pressure less than a compressor outlet pressure. The bleed air may be drawn from a mid-section of a compressor wheel and mixed with exhaust gas in an exhaust passage to decrease a temperature of one or more catalysts arranged in an exhaust system.

Figure 2:
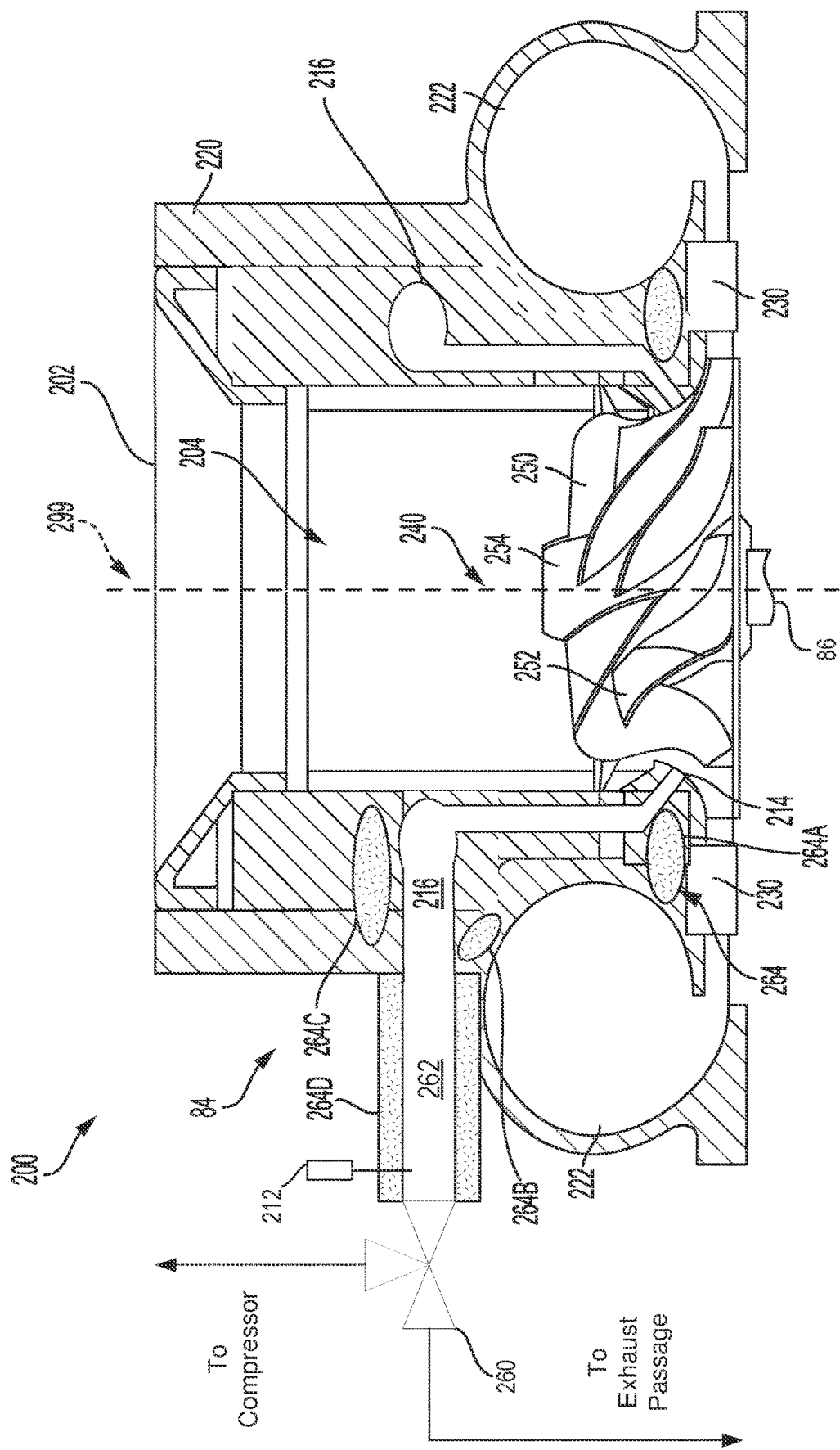
FIG. 2 illustrates a schematic of a compressor including a bleed port.

A detailed view of the compressor is illustrated in FIG. 2. Therein, the compressor includes a compressor housing with a plurality of coolant passages arranged therein. The bleed port is positioned based on a length of the compressor blade wheels. In one example, the bleed port is arranged adjacent to a range between 40 to 80% of a total length of the compressor blade wheels. The bleed port position may be based on one or more of a compressor size, a desired catalyst temperature, and a surge margin.

Figure 3:
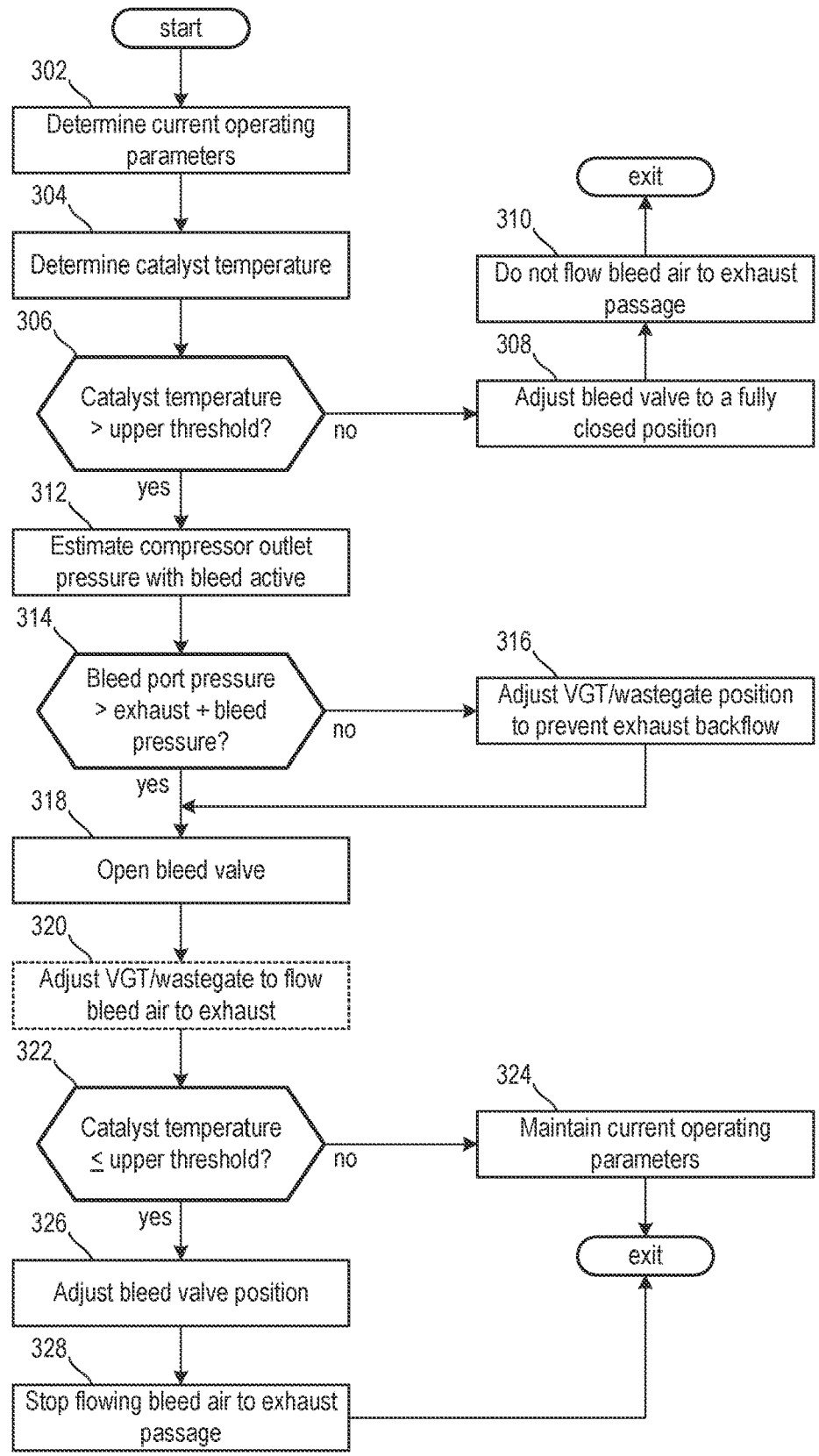
FIG. 3 illustrates a method for flowing bleed air to a catalyst in an exhaust passage.
Figure 4:
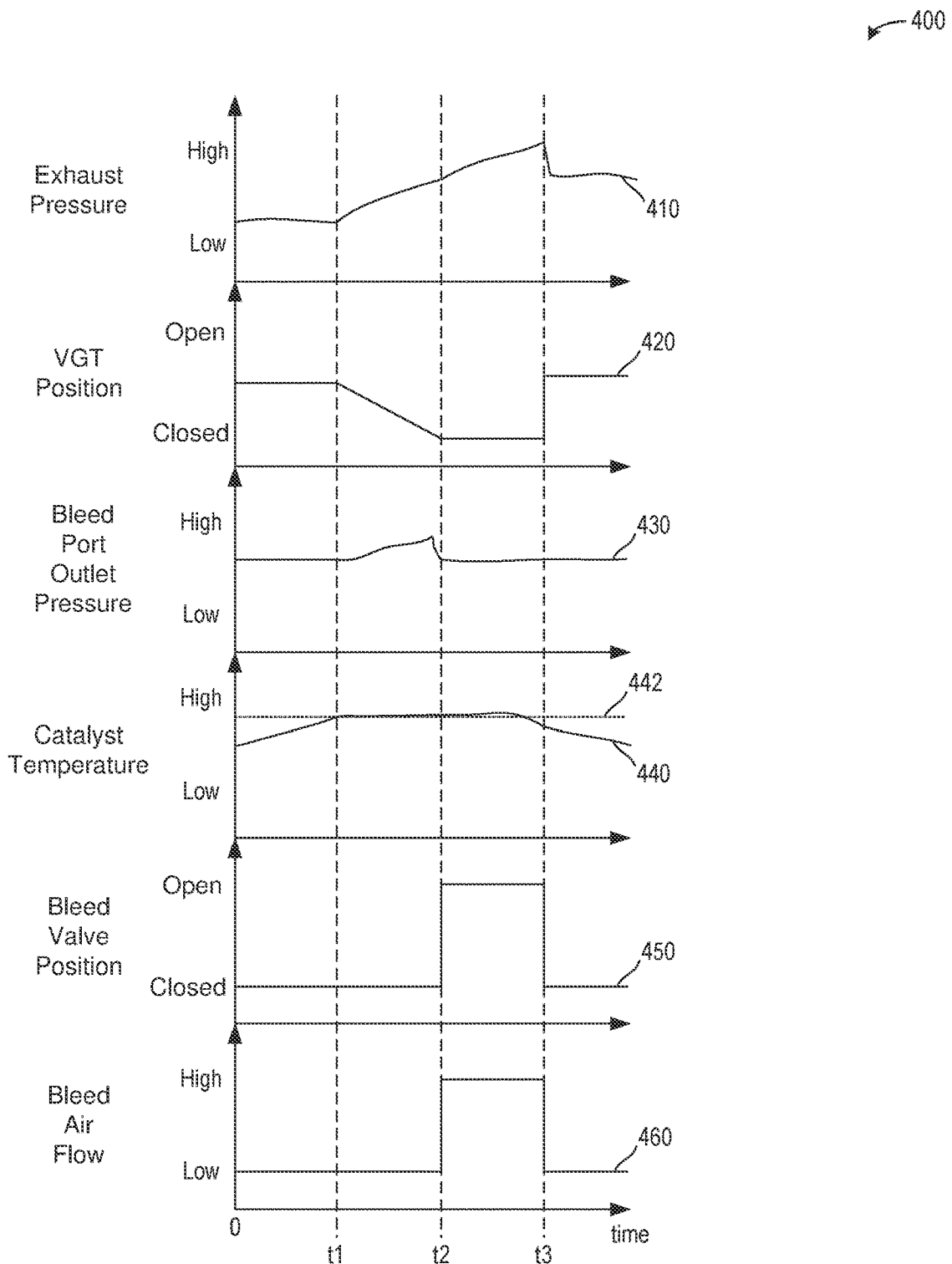
FIG. 4 illustrates a graph showing an engine operating sequence based on the method of FIG. 3.

The plurality of coolant passages may be positioned adjacent to the bleed port and an outlet passage extending from the compressor housing to the exhaust passage. One of the plurality of coolant passages may circumferentially surround the outlet passage in an area outside of the compressor housing. A method for adjusting bleed air flow to the exhaust passage based on the catalyst temperature is shown in FIG. 3. A graph illustrating changes in operating conditions based on the method of FIG. 3 is shown in FIG. 4.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices 70 may include a three-way catalyst, lean NOx trap, diesel particulate filter, oxidation catalyst, selective catalytic reduction (SCR) device, etc. It will be appreciated that other components may be included in the engine such as a variety of valves and sensors, as further elaborated in herein.

In some embodiments, wherein engine system 8 is a boosted engine system, the engine system may further include a boosting device, such as a turbocharger comprising a turbine 82 and a compressor 84. The turbine 82 and the compressor 84 may be rotatably coupled to one another via a shaft 86. The turbine 82 may rotate via an exhaust gas flow, wherein rotation of the turbine 82 may translate into rotation of the compressor 84 via the shaft 86. In some examples, additionally or alternatively, the compressor 84 may be powered via an electric motor, such as motor/generator 51 (not shown). In such an example, the turbine 82 may be omitted or may be used in combination with the electric motor to drive the compressor 84.

An outlet passage 88 may extend from the compressor 84 to a portion of the exhaust passage 35 between the turbine 82 and the emission control device 70. The outlet passage 88 may direct bleed air from the compressor 84 to the portion of the exhaust passage 35 when emission control device cooling is requested. A bleed valve 89 may regulate the flow of bleed air through the outlet passage 88 to the exhaust passage 35. Cooling may be requested in based on a temperature of the emission control device 70, which may be determined via feedback from a temperature sensor 128. If cooling is requested, then the bleed valve 89 may be actuated to an open position to flow an amount of bleed air to the exhaust passage 35.

The outlet passage 88 may extend to a middle of the exhaust passage 35, wherein an outlet of the outlet passage 88 is equidistant to inner surface of the exhaust passage 35. A spacing between the outlet and the emission control device 70 may be based on a combination of a mix rate between the bleed air and exhaust gas along with a desired temperature change of exhaust gas. For example, if the outlet is positioned closer to the turbine 82, then mixing may increase while a temperature reduction of the emission control device 70 may decrease due to thermal communication with an exhaust pipe and ambient air.

The outlet may direct bleed air in a direction parallel to an exhaust gas flow. Thus, the outlet may face a direction parallel to exhaust gas flow, which may reduce a likelihood of exhaust gas entering the outlet passage 88. Additionally or alternatively, the outlet may include one or more features that may enhance and/or promote the flow of bleed air into the exhaust passage. For example, the outlet may include a nozzle, a venturi passage, or other feature that may increase a pressure of bleed air to further promote its flow into the exhaust passage 35 and increase a rate of mixing with exhaust gases.

The engine system 8 may further include an EGR passage 72. The EGR passage 72 may be a high-pressure (HP) EGR passage with an EGR valve 74 configured to control EGR flow. The EGR passage 72 may optionally include an EGR cooler 76 arranged therein.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine. In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 2 shows a cut-away view 200 of an example embodiment the compressor 84. The compressor 84 may be rotated via a turbine (e.g., turbine 82 of FIG. 1) and/or the electric motor 51.

Compressor 84 includes an impeller 240, a diffuser 230, a compressor chamber 222, and housing 220. The rotation of impeller 240, draws gas into compressor 84 and through compressor inlet 202 of housing 220. As non-limiting examples, the gas may include air from intake 42, exhaust gas (such as low-pressure EGR), gaseous fuel (such as when using port injection of fuel), and combinations thereof. Gas flows from compressor inlet 202 and is accelerated by impeller 240 through diffuser 230 into compressor chamber 222. Diffuser 230 and compressor chamber 222 decelerate the gas causing an increase in pressure in compressor chamber 222. Gas under pressure may flow from compressor chamber 222 to intake manifold 44.

An element substantially in the direction of gas flow relative to a reference point is downstream from the reference point. An element substantially opposite the direction of gas flow relative to a reference point is upstream from the reference point. For example, compressor inlet 202 is upstream from impeller 240 which is upstream from diffuser 230. Diffuser 230 is downstream from impeller 240 which is downstream from compressor inlet 202.

Impeller 240 includes hub 254, full blade 250, and splitter 252. Full blade 250 and splitter 252 are attached to hub 254. In some examples, the splitter blade 252 may be omitted and only a full blade configuration may be included. The edge of full blade 250 that is most upstream in compressor 84 is the leading edge of full blade 250. Similarly, splitter 252 includes a leading edge at the most upstream portion of splitter 252. The leading edge of full blade 250 is upstream of splitter 252. Impeller 240 includes an axis of rotation 299 aligned with the axis of rotation for drive shaft 86 and a turbine hub. The axis of rotation is substantially parallel with the flow of gas at the compressor inlet and substantially perpendicular to the flow of gas at the diffuser.

Housing 220 includes compressor inlet 202, intake passage 204, a bleed chamber 216, and bleed port 214. Impeller 240 is contained in intake passage 204. The bleed chamber 216 may be integrally arranged in the compressor housing 220. Bleed port 214 is downstream of the leading edge of splitter 252. Additionally or alternatively, the bleed port 214 may be arranged relative to a length of the impeller 240. The bleed port 214 is positioned downstream of an upstream-most point of the impeller 240 by a distance equal to 40-80% of the total length of the impeller measured parallel to the axis of rotation 299.

The bleed chamber 216 may include a volute region. The volute region may correspond to a deviation in a size of the bleed chamber 216. More specifically, the bleed chamber 216 may include a first diameter from adjacent to the impeller to the volute region, wherein a second diameter of the volute region is greater than the first diameter. The bleed chamber 216 may comprise a third diameter from the volute region to an outlet passage 262, wherein the third diameter is greater than the first diameter and less than the second diameter. The volute region may reduce a kinetic energy of the bleed air flow, which may increase a pressure thereof.

A bleed valve 260 may be configured to control the flow of bleed air through the outlet passage 262 coupled to the bleed chamber 216. In one example, the outlet passage 262 is a non-limiting example of the outlet passage 88 of FIG. 1. A mass flow sensor 212 may be positioned to sense a flow rate of bleed air through the outlet passage 262.

The bleed valve 260 may be a two-way valve configured to only control bleed air flow to the exhaust passage, such as exhaust passage 35 of FIG. 1. Additionally or alternatively, the bleed valve 260 may be a three-way valve configured to control bleed air flow to the exhaust passage and/or to back to the compressor intake passage, such as back to the compressor inlet or a port upstream of impeller 240. The valve 260 may be adjusted to a fully closed position, a fully open position, or a position therebetween. The fully closed position may block bleed air flow and the fully open position may allow 100% bleed air flow. The return bleed air may be directed back to the compressor inlet 202 and/or directly to the impeller 240. Bleed air flow back to the compressor inlet may allow the compressor to operate at a higher pressure ratio without causing surge to occur while at the same time stopping flow to the exhaust system which may not be wanted because it is not needed for catalyst cooling at that time. The bleed valve 260 may be a non-limiting example of bleed valve 89 of FIG. 1. Control of the bleed valve 260 based on a catalyst temperature is described in greater detail below with respect to FIG. 3.

Additionally or alternatively, and as will be described in greater detail below, the bleed valve 260 may be adjusted based on a desired bleed mass flow rate in combination with the catalyst temperature being less than or equal to an upper threshold temperature. The desired bleed mass flow rate may be based on an engine air mass flow and a compressor pressure ratio.

Additionally or alternatively, the bleed valve 260 may include a first valve and a second valve. The first valve may control bleed air flow from the bleed chamber 216 to the exhaust passage. The second valve may control bleed air flow to the compressor inlet or to a port upstream of the impeller 240. The second valve may be operated to extend a compressor pressure ratio prior to surge. In one example, if catalyst cooling is desired (e.g., the catalyst temperature is greater than the upper threshold temperature) then the first valve may be adjusted to a more open position or a fully open position. If the bleed air flow rate is below the desired bleed mass flow rate, then the second valve may be adjusted to a more open position to achieve the desired bleed mass flow rate. If the bleed air flow rate is greater than the desired bleed mass flow rate, then the second valve may be adjusted to a more closed position. If catalyst cooling is not desired (e.g., the catalyst temperature is less than or equal to the upper threshold temperature), then the first valve may be adjusted to a fully closed position. If the bleed air flow rate is greater than the desired bleed mass flow rate, then the second valve may be adjusted to a more closed position or a fully closed position. The operation described above may also be applied to the embodiment comprising the three-way valve.

A desired bleed port pressure may be achieved via adjusting a position of vanes of a variable geometry turbine (VGT). In one example, adjusting the position of the vanes to a more closed position may increase the bleed port pressure.

A plurality of coolant passages 264 may be arranged in the compressor housing 220. In one example, the plurality of coolant passages 264 are integrally arranged in the compressor housing 220. Additionally or alternatively, one or more of the plurality of coolant passages 264 may be arranged as pipes. The plurality of coolant passages 264 may be arranged proximally to only the bleed port 214 such that cooling may be provided to only the bleed air. In this way, a thermal demand of the coolant system fluidly coupled to the plurality of coolant passages 264 may be reduced compared to cooling provided to an entirety of the compressor. In one example, the plurality of coolant passages 264 is fluidly coupled to a cooling system of the engine. By cooling the bleed air with coolant, a temperature reduction of the catalyst may be enhanced.

The plurality of coolant passages 264 may include a first passage 264A, a second passage 264B, a third passage 264C, and a fourth passage 264D. The first, second, third, and fourth passages may be a single, continuous passage. The first passage 264A may be more downstream than the second passage 264B, the third passage 264C, and the fourth passage 264D. The first passage 264A may be adjacent to the bleed port 214 and provide cooling to bleed air flowing through the bleed port 214 and into the bleed chamber 216. As illustrated, the first passage 264A may be circular and surround an entirety of the bleed port 214. The second passage 264B and the third passage 264C may be adjacent to an interface between the bleed chamber 216 and the outlet passage 262. The second passages 264B may be downstream of the third passage 264C. Each of the second passage 264B and the third passage 264C may be positioned only adjacent to the interface. As such, the second passage 264B and the third passage 264C may not be circular and extend around an entirety of the compressor housing 220. The fourth passage 264D may surround the outlet passage 262. The fourth passage 264D may be positioned outside of the compressor housing 220 and extend to the valve 260. Additionally or alternatively, the fourth passage 264D may surround the outlet passage 262 from the compressor housing 220 to the exhaust passage.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, it shows a method 300 for adjusting a bleed valve of the compressor in response to a catalyst temperature. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 300 begins at 302, which includes determining current operating parameters. Current operating parameters may include, but are not limited to, one or more of a throttle position, a manifold pressure, an engine temperature, an engine speed, a vehicle speed, an exhaust-gas recirculation (EGR) flow rate, and an air-fuel ratio.

At 304, the method 300 may include determining a catalyst temperature. A temperature sensor, such as temperature sensor 128 of FIG. 1, may provide feedback regarding a catalyst temperature. Additionally or alternatively, the catalyst temperature may be estimated based on data stored in a multi-input look-up table, wherein inputs include an engine run-time, an engine load, an exhaust flow rate, a boost rate, a throttle position, the EGR flow rate, and an air-fuel ratio.

At 306, the method 300 may include determining if the catalyst temperature is greater than an upper threshold temperature. The upper threshold temperature may correspond to a catalyst temperature where a likelihood of degradation may increase. For example, if the catalyst is an SCR device, then the upper threshold temperature may be equal to approximately 500° C. It may be desired to limit time spent above the upper threshold temperature to maintain a $NO_x$ conversion efficiency and decrease emissions.

If the catalyst temperature is not greater than the upper threshold temperature, then at 308, the method 300 may include adjusting the bleed valve to a fully closed position.

At 310, the method 300 may include not flowing bleed air to the exhaust passage. In this way, the catalyst temperature may be maintained due to cool bleed air not flowing thereto.

In some embodiments, if the bleed valve is a three-way bleed valve, then a position of the bleed valve may be adjusted to block bleed air flow to the exhaust passage while optionally flowing bleed air to a compressor inlet. By doing this, a surge margin of the compressor may be improved. Such an example may occur during a cold-start or during a load step from idle load to peak torque.

Returning to 306, if the catalyst temperature is greater than the upper threshold, then at 312, the method may include estimating a compressor outlet pressure with bleed being active. Active bleed may result in a lower compressor outlet pressure and a higher exhaust pressure. Thus, a change in pressures may be determined to estimate if exhaust backflow may occur. The estimating may be based on data stored in a multi-input look-up table, wherein inputs include the catalyst temperature, a projected bleed air flow rate, a current exhaust pressure, and a current compressor outlet pressure. The projected bleed air flow rate may be proportional to a difference between the catalyst temperature and the upper threshold temperature, wherein as the difference increases, the projected bleed air flow rate may also increase. In this way, more bleed air may be directed to the exhaust passage as the catalyst temperature increases. Additionally or alternatively, the bleed port outlet pressure may be sensed directly via a pressure sensor.

Additionally or alternatively, a bleed port outlet pressure may be used in combination with or instead of the compressor outlet pressure. The bleed port outlet pressure may be estimated via a data stored in a multi-input look-up table, wherein inputs may include compressor speed, bleed valve position, turbine speed, and the like. Additionally or alternatively, the bleed port outlet pressure may be sensed directly via a pressure sensor positioned in the bleed chamber of the compressor. In one example, the bleed port outlet pressure may be maintained above a pressure of an area to which the bleed air flow is being directed. For example, if bleed air flow is being directed to the exhaust passage, then the pressure of the bleed air flow may be maintained or adjusted to be above the exhaust gas pressure within a margin.

At 314, the method 300 may include determining if the compressor outlet pressure is greater than an exhaust pressure including the bleed air pressure. If the compressor outlet pressure is estimated to not be greater than the exhaust pressure when bleed air will be active, then at 316, the method 300 may include adjusting an exhaust pressure downstream of the turbine. The exhaust pressure may be adjusted as a function of an exhaust gas flow rate and an exhaust gas temperature. For example, to decrease the exhaust pressure, the exhaust gas flow rate may be reduced and/or the exhaust gas temperature may be reduced. In one example, the exhaust gas temperature may be reduced by adjusting engine operating parameters, such as advancing an injection timing and/or advancing a spark timing.

Additionally or alternatively, the bleed port outlet pressure may be adjusted via adjusting a VGT position. Adjusting the VGT may include moving vanes of the turbine to a more open position to adjust a compressor load, which may directly adjust a bleed port outlet pressure. In one example, the VGT or the wastegate may be moved to a closed position, which may increase the bleed port outlet pressure, which may further mitigate exhaust backflow.

If the compressor outlet pressure is greater than the exhaust pressure including the bleed air pressure, or following adjustment of the VGT or wastegate, then at 318, the method 300 may include opening the bleed valve. If the bleed valve is a two-way bleed valve, the bleed valve may be moved from a fully closed position to a fully open position. If the bleed valve is a three-way bleed valve, the bleed valve may be moved to a position where bleed air may flow to the exhaust passage without reentering the compressor.

At 320, the method 300 may optionally include adjusting the VGT or wastegate to flow bleed air to the exhaust passage. Adjusting the VGT or the wastegate may include closing the VGT or the wastegate more to allow bleed air to enter the exhaust passage.

At 322, the method 300 may include determining if the catalyst temperature is less than or equal to the upper threshold temperature. If the catalyst temperature is not less than or equal to the upper threshold temperature, then at 324, the method 300 may include maintaining current operating parameters. As such, the catalyst temperature may continue to decrease via bleed air being directed to the exhaust passage.

If the catalyst temperature is less than or equal to the upper threshold temperature, then at 326, the method 300 may include adjusting a bleed valve position. The bleed valve position may be adjusted to a fully closed position if the bleed valve is a two-way valve. Additionally or alternatively, if the bleed valve is a three-way valve, the bleed valve may be adjusted to a position that block bleed air from flowing to the exhaust passage. The position of the three-way valve may be adjusted to allow bleed air to recirculate to the compressor or block active bleed air flow.

At 328, the method 300 may include blocking bleed air flow to the exhaust passage. As such, the catalyst temperature may no longer be reduced via bleed air.

Turning now to FIG. 4, it shows a graph 400 illustrating an engine operating sequence based on the method 300 of FIG. 3. Plot 410 illustrates an exhaust pressure. Plot 420 illustrates a VGT position. Plot 430 illustrates a bleed port outlet pressure. Plot 440 illustrates a catalyst temperature and dashed line 442 represents an upper threshold temperature. Plot 450 illustrates a bleed valve position. Plot 460 illustrates a bleed air flow rate to the exhaust passage. Time increases from a left to a right side of the figure.

Prior to t1, the catalyst temperature (plot 440) increases toward the upper threshold temperature (dashed line 442). At t1, the catalyst temperature increases above the upper threshold temperature.

Between t1 and t2, the VGT position (plot 420) is adjusted to a fully closed position to increase the bleed port outlet pressure (plot 430) for opening the bleed valve. As such, the exhaust pressure (plot 410) may increase. The catalyst temperature may slightly decrease or stop increasing via the increase in bleed air flow to the exhaust passage.

At t2, the bleed valve position is adjusted to a fully open position from a fully closed position. Between t2 and t3, the VGT position is maintained at a fully closed position. The bleed air flow increases to a non-zero value. In one example, the bleed air flow increases to a relatively high value. The catalyst temperature may decrease to a temperature less than the upper threshold temperature due to bleed air flow. The VGT position may be set for the bleed port outlet pressure to force bleed air flow into the exhaust passage even with the increase in exhaust gas pressures.

At t3 and after, the catalyst temperature falls below the upper threshold temperature. As such, the bleed valve position is adjusted to a fully closed position and the bleed air flow to the exhaust passage is blocked. Thus, the bleed air flow rate is adjusted to zero, resulting in the exhaust pressure decreasing. The compressor outlet pressure may decrease.

In this way, the compressor bleed port may reduce or maintain a compressor size which may enhance a mid-load compressor efficiency, compared to a post compressor bleed, which will require a larger compressor. The technical effect of reducing the compressor size by introducing the compressor bleed port is to increase peak torque performance, decreases a transient response time, and decreases a turbine inlet pressure, which may increase overall engine efficiency. By doing this, the compressor size may be reduced while also controlling a catalyst temperature to a desired temperature.

The disclosure provides support for a method including flowing bleed air from a bleed port of a compressor to a portion of an exhaust passage upstream of a catalyst in response to a catalyst temperature. A first example of the method further includes where the catalyst temperature is greater than an upper threshold temperature. A second example of the method, optionally including the first example, further includes adjusting a bleed valve to an open position. A third example of the method, optionally including one or more of the previous examples, further includes flowing bleed air comprises adjusting a bleed air flow rate based on the catalyst temperature. A fourth example of the method, optionally including one or more of the previous examples, further includes increasing the bleed air flow rate as the catalyst temperature increases. A fifth example of the method, optionally including one or more of the previous examples, further includes the bleed port is arranged in a cooled compressor housing. A sixth example of the method, optionally including one or more of the previous examples, further includes a cooling jacket is arranged adjacent to the bleed port.

The disclosure further provides support for a system including a compressor comprising a bleed port, a valve configured to control bleed air flow from the bleed port to a portion of an exhaust passage upstream of a catalyst, a controller comprising computer-readable instructions stored on non-transitory memory that when executed enable the controller to adjust a position of the valve in response to a temperature of the catalyst exceeding an upper threshold temperature to flow bleed air to the exhaust passage. A first example of the system further includes where the bleed port is arranged near a cooling passage integrated into a housing of the compressor. A second example of the system, optionally including the first example, further includes where the cooling passage is one of a plurality of cooling passages, the plurality of cooling passages arranged adjacent to the bleed port and an outlet passage fluidly coupled to the portion of the exhaust passage. A third example of the system, optionally including one or more of the previous examples, further includes where the cooling passage extends around an outlet passage fluidly coupled to the portion of the exhaust passage, the outlet passage arranged outside of the housing. A fourth example of the system, optionally including one or more of the previous examples, further includes where the valve is a three-way valve configured to control bleed air flow to the exhaust passage and back to the compressor. A fifth example of the system, optionally including one or more of the previous examples, further includes where the catalyst is a selective-catalytic reduction device. A sixth example of the system, optionally including one or more of the previous examples, further includes where the bleed port is arranged at adjacent to compressor blades at a location downstream of an upstream-most portion of the compressor blades by a percentage of a total blade length measured in a direction of intake air flow. A seventh example of the system, optionally including one or more of the previous examples, further includes where the instructions further enable the controller to adjust the position of the valve to a fully closed position in response to the temperature of the catalyst being less than or equal to the upper threshold temperature.

The disclosure further provides support for a method including flowing bleed air from a bleed port of a compressor to a portion of an exhaust passage upstream of a catalyst in response to a catalyst temperature exceeding an upper threshold temperature and flowing bleed air from the bleed port of the compressor back to an inlet of the compressor in response to the catalyst temperature being less than or equal to the upper threshold temperature. A first example of the method further including cooling bleed air via a plurality of cooling passages integrally arranged in a compressor housing and circumferentially surrounding an outlet passage extending from the bleed port to the exhaust passage. A second example of the method, optionally including the first example, further including adjusting a position of a valve configured to control air flow from a compressor blade to the bleed port. A third example of the method, optionally including one or more of the previous examples, further includes where the bleed port is arranged adjacent to a mid-portion of the compressor blade. A fourth example of the method, optionally including one or more of the previous examples, further includes where a flow rate of the bleed air is a fixed rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
flowing bleed air from a bleed port of a compressor to a portion of an exhaust passage upstream of a catalyst in response to a catalyst temperature.

2. The method of claim 1, wherein the catalyst temperature is greater than an upper threshold temperature.

3. The method of claim 1, further comprising adjusting a bleed valve to an open position.

4. The method of claim 1, wherein the bleed port is arranged in a cooled compressor housing.

5. The method of claim 1, wherein a cooling jacket is arranged adjacent to the bleed port.

6. The method of claim 1, wherein flowing bleed air comprises adjusting a bleed air flow rate based on the catalyst temperature.

7. The method of claim 6, further comprising increasing the bleed air flow rate as the catalyst temperature increases.

8. A system, comprising:
a compressor comprising a bleed port;
a valve configured to control bleed air flow from the bleed port to a portion of an exhaust passage upstream of a catalyst;
a controller comprising computer-readable instructions stored on non-transitory memory that when executed enable the controller to:
adjust a position of the valve in response to a temperature of the catalyst exceeding an upper threshold temperature to flow bleed air to the exhaust passage.

9. The system of claim 8, wherein the bleed port is arranged near a cooling passage integrated into a housing of the compressor.

10. The system of claim 8, wherein the valve is a three-way valve configured to control bleed air flow to the exhaust passage and back to the compressor.

11. The system of claim 8, wherein the catalyst is a selective-catalytic reduction device.

12. The system of claim 8, wherein the bleed port is arranged at adjacent to compressor blades at a location downstream of an upstream-most portion of the compressor blades by a percentage of a total blade length measured in a direction of intake air flow.

13. The system of claim 8, wherein the instructions further enable the controller to adjust the position of the valve to a fully closed position in response to the temperature of the catalyst being less than or equal to the upper threshold temperature.

14. The system of claim 9, wherein the cooling passage is one of a plurality of cooling passages, the plurality of cooling passages arranged adjacent to the bleed port and an outlet passage fluidly coupled to the portion of the exhaust passage.

15. The system of claim 9, wherein the cooling passage extends around an outlet passage fluidly coupled to the portion of the exhaust passage, the outlet passage arranged outside of the housing.

16. A method, comprising
flowing bleed air from a bleed port of a compressor to a portion of an exhaust passage upstream of a catalyst in response to a catalyst temperature exceeding an upper threshold temperature; and
flowing bleed air from the bleed port of the compressor back to an inlet of the compressor in response to the catalyst temperature being less than or equal to the upper threshold temperature.

17. The method of claim 16, further comprising cooling bleed air via a plurality of cooling passages integrally arranged in a compressor housing and circumferentially surrounding an outlet passage extending from the bleed port to the exhaust passage.

18. The method of claim 16, wherein a flow rate of the bleed air is a fixed rate.

19. The method of claim 16, further comprising adjusting a position of a valve configured to control air flow from a compressor blade to the bleed port.

20. The method of claim 19, wherein the bleed port is arranged adjacent to a mid-portion of the compressor blade.

* * * * *